United States Patent
Gimmler et al.

(10) Patent No.: US 6,278,911 B1
(45) Date of Patent: Aug. 21, 2001

(54) METHOD FOR RECOGNIZING A SPONTANEOUS DEMAND BY A DRIVER OF A MOTOR VEHICLE FOR A DYNAMIC RESPONSE

(75) Inventors: Helmut Gimmler, Schwaikheim; Andreas Heindinger, Winterbach; Klaus-Peter Kuhn, Plüderhausen, all of (DE)

(73) Assignee: Daimler-Benz Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/112,895

(22) Filed: Jul. 9, 1998

(30) Foreign Application Priority Data

Jul. 9, 1997 (DE) .............................. 197 29 251

(51) Int. Cl.$^7$ ...................................................... B62D 6/00
(52) U.S. Cl. .................................. 701/1; 701/79; 701/85
(58) Field of Search ................................... 701/79, 1, 85, 701/104; 180/141, 79.1, 14.1

(56) References Cited

U.S. PATENT DOCUMENTS

| | | | |
|---|---|---|---|
| 4,679,145 | 7/1987 | Beeck et al. | 364/424.1 |
| 5,172,785 | * 12/1992 | Takahashi | 180/141 |
| 5,189,621 | * 2/1993 | Onari et al. | 364/431.04 |
| 5,285,523 | 2/1994 | Takahashi | 395/22 |
| 5,390,117 | * 2/1995 | Graf et al. | 364/424.1 |
| 5,491,635 | * 2/1996 | Foeldi et al. | 364/431.1 |
| 5,557,521 | * 9/1996 | Danz et al. | 364/424.1 |
| 5,895,435 | * 4/1999 | Ohta et al. | 701/59 |

FOREIGN PATENT DOCUMENTS

| | | |
|---|---|---|
| 3341 652 | 6/1985 | (DE) . |
| 43 22 476 | 1/1994 | (DE) . |
| 4401 416 | 7/1995 | (DE) . |
| 197 30 904 | 2/1999 | (DE) . |
| 433603 | 10/1990 | (EP) . |
| 0 622 570 | 11/1994 | (EP) . |
| 0 777 071 | 6/1997 | (EP) . |
| 56-163417 | 12/1981 | (JP) . |
| 6-129521 | 5/1994 | (JP) . |

\* cited by examiner

*Primary Examiner*—William A. Cuchlinski, Jr.
*Assistant Examiner*—Marthe Y. Marc-Coleman
(74) *Attorney, Agent, or Firm*—Kenyon & Kenyon

(57) ABSTRACT

A method for recognizing a spontaneous demand by a driver of a motor vehicle for a dynamic response, the extent of the actuation of an operating device being compared to a threshold value, and the demand for a dynamic response being recognized when the extent of actuation lies above a specific threshold value, and, when comparing the extent of actuation to the threshold value, allowance being made for the manner in which the vehicle driver normally actuates the operating device.

12 Claims, 1 Drawing Sheet

METHOD FOR RECOGNIZING A SPONTANEOUS DEMAND BY A DRIVER OF A MOTOR VEHICLE FOR A DYNAMIC RESPONSE

FIELD OF THE INVENTION

The present invention relates to a method for recognizing a spontaneous demand by a driver of a motor vehicle for a dynamic response.

RELATED TECHNOLOGY

A method for recognizing a spontaneous demand may be performed using, for example, a kickdown switch. A switch of this type recognizes the end position of a gas pedal or accelerator. From this position, it may deduced that the vehicle driver desires a maximum acceleration. An intervention is then carried out in an engine/transmission management system in order to reach a maximum vehicle acceleration. To that end, in the case of an automatic transmission, for example, a gear downshift is performed automatically. In this connection, instead of the attainment of a predefined angular position of the accelerator, it is also known to the applicant to evaluate the velocity with which the accelerator is actuated.

In this context, the threshold is rigidly predefined, and must be exceeded by each vehicle driver in the same manner, regardless of his/her driving style.

German Patent No. 33 41 652 C2 discloses adapting the threshold values of the actuation of an accelerator, in response to which values a gear downshift is performed to attain better acceleration, to the driving technique, i.e. to the normal actuation of the accelerator by the vehicle driver. In this case, given a driving technique recognized as sporty, a gear downshift is performed earlier. This means that the threshold values are lowered. Thus, to attain better acceleration, a gear downshift is performed in response to a lesser extent of actuation of the accelerator in the case of a driving technique recognized as sporty than in the case of a driving technique recognized as steady.

SUMMARY OF THE INVENTION

The present invention relates to a method which makes it possible to recognize a spontaneous demand by the vehicle driver for a dynamic response, i.e. the demand for maximum acceleration. The present invention thus provides a method in which, when comparing the extent of actuation to a threshold value, allowance is made for how the vehicle driver normally actuates the operating device. When a driving technique is detected as sporty, a greater extent of actuation is then required in order for a spontaneous dynamic-response demand to be recognized than for a driving technique detected as steady. The dynamic response demand is recognized when the extent of actuation exceeds the threshold value.

Advantageously, this makes it possible to distinguish between a vehicle driver having a smooth driving style, and a driver with a sportier driving style. In other words, with a rigidly set threshold value discussed above as related technology, it is only possible to set the threshold value optimally for one certain type of vehicle driver. Thus if the vehicle is adjusted to a driver having a sportier driving style, the operating device will be actuated by a comparatively forceful actuation before a spontaneous demand for a dynamic response is recognized. Such a design may lead to difficulties for drivers having a steadier or smoother driving style, because they will not actuate the actuating device forcefully enough, even when they want a spontaneous demand for a dynamic response. On the other hand, if the threshold value is adjusted to a vehicle driver having a steadier driving style, then it can occur that a driver having a sportier driving style will actuate the operating device such that a spontaneous demand for a dynamic response is recognized, although a normal driving situation for this driver still exists.

The operating device may be the accelerator. It thus is advantageously immediately recognized whether a spontaneous demand exists for a dynamic response based on an actuation of the accelerator. The velocity with which the accelerator is actuated, and, in particular, the actuating direction, are advantageously evaluated. That is to say, a spontaneous demand for a dynamic response is only recognized when the accelerator is moved in the direction of an acceleration.

The manner in which the vehicle driver normally actuates the operating device may be taken into account, in that the extent of actuation of the operating device is continuously ascertained, and a statistical evaluation is carried out with regard to the extent of actuation, at least in certain driving situations.

For example, the evaluation with respect to certain driving situations can be carried out using the method in German Patent Application DE 44 01 416 A1 (hereby incorporated by reference herein), according to which various driving styles are each described according to a plurality of characteristic numerals. In so doing, the characteristic numerals for the longitudinal acceleration, the transverse acceleration and the deceleration are evaluated separately. Advantageously, the characteristic numeral for the longitudinal acceleration is drawn upon for utilization in the method of the present invention. In so doing, it is possible to advantageously draw upon the accelerations during which the motor vehicle is accelerated by approximately 10 km/h. For example, the maximum accelerator velocity can be ascertained for each of these vehicle accelerations, and be appropriately further processed for the statistical evaluation. Moreover, these values are not distributed normally, because a driver can step on the accelerator arbitrarily slowly, but not arbitrarily quickly. For example, the median (med) and the standard deviation (sig) can be determined. The individual sensitivity of the vehicle driver (emp) can be calculated according to the formula: emp=med+sig * f, where f is a sensitivity factor, so that the sensitivity of the algorithm is adjusted with the factor f.

The values of the more recent past may receive a greater weighting during the evaluation than the values of the more distant past. In this manner, the method of the present invention is also advantageously adapted to a changing driving style of the vehicle driver, or even to a different driver.

The detected angular position of the accelerator also may be filtered and differentiated, the filtering being forestalled in the event the accelerator is released with an angular velocity above a threshold value.

Filtering can suppress short-duration signal fluctuations for the evaluation. Because filtering is forestalled in response to a quick release of the accelerator, vehicle decelerations which may be desired are realized as quickly as possible.

Given a recognized demand for a dynamic response, the demand may last for a period of time, this time being longer in the case of a sporty driving technique than for a steady driving technique. Thus, an abrupt change in the vehicle performance is advantageously avoided. In the same way, the individual driving style is again taken into account here, as well.

In addition, a variable or a bit may be set for the recognized dynamic-response demand, this variable or the bit being set as soon as the dynamic-response demand is recognized. The variable or the bit is reset as soon as the conditions of the dynamic-response demand no longer exist and the accelerator angle equals 0. Thus, the method of the present invention is easily executable on a microprocessor. As the variable or the bit is first set back when the accelerator angle equals 0, "jumps" or sudden changes in the vehicle performance can be avoided. This improves both travel comfort and travel safety.

A value as well may formed using the extent of the actuation of the operating device and the extent of the normal actuation of the operating device, the value being compared to the threshold value. Thus, allowance is made for the individual driving style by adapting the value, which is compared to the threshold value, to the individual driving style.

The threshold value also may altered as a fiction of the driving technique of the vehicle driver. This can be carried out in place of, or in addition to changing the value to be compared to the threshold value discussed above. Implementation of these features makes it possible to take the individual driving style into consideration in a particularly efficient manner.

In addition, if the operation of the vehicle by the driver is determined to be nervous or unsteady, the recognition of a spontaneous demand for a dynamic response may be discontinued. Thus, an incorrect intervention in the engine/transmission management is advantageously avoided.

BRIEF DESCRIPTION OF THE DRAWINGS

An exemplary embodiment of the present invention is depicted more precisely in FIG. 1, which shows a block diagram of the various elements and their interaction for carrying out the method of the present invention.

DETAILED DESCRIPTION

Figure 1:
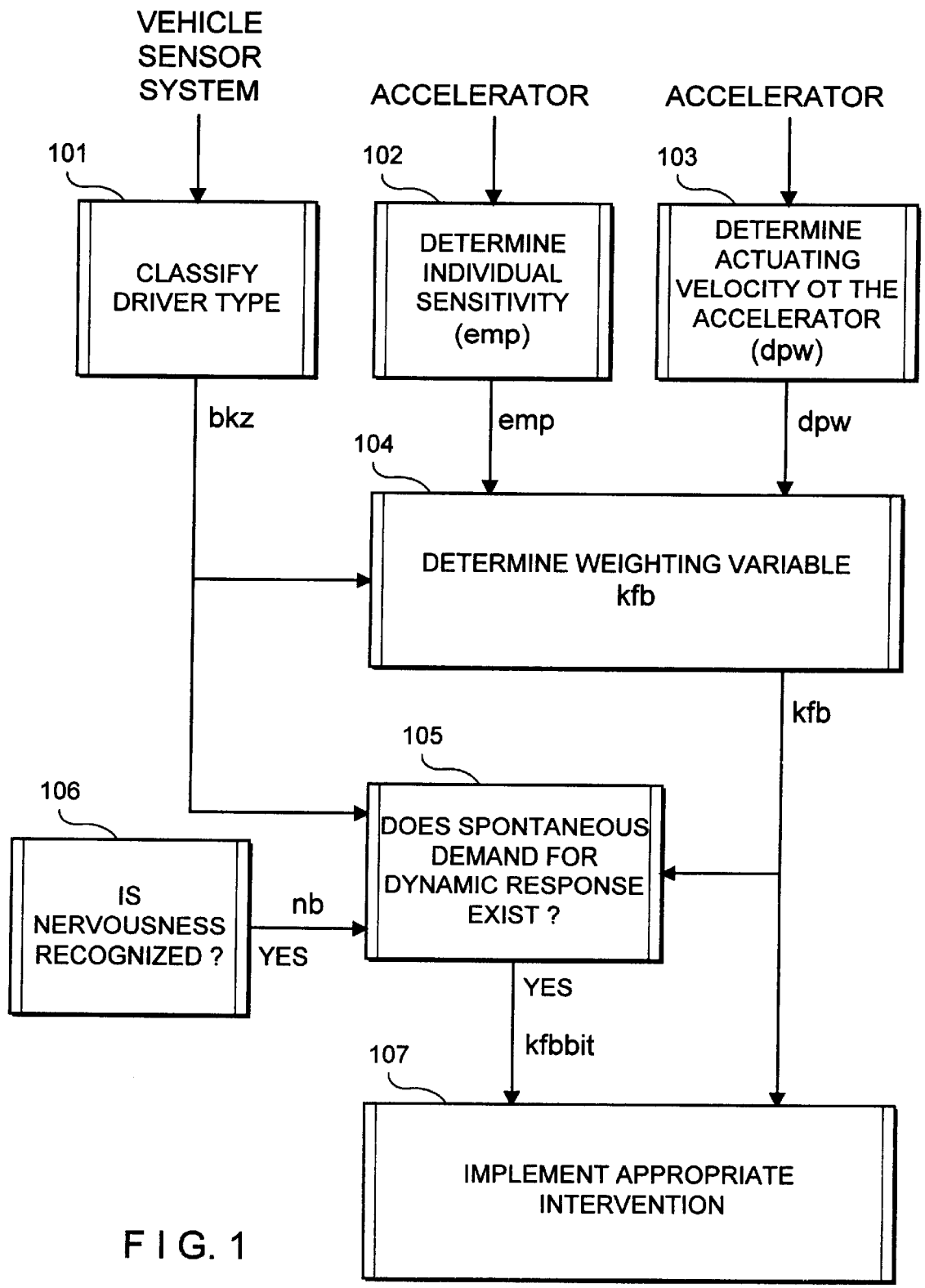

In Block 101, a driver type is classified on the basis of signals and data supplied to the vehicle sensory system. Using this driver-type classification, a sporty driving behavior can be distinguished from a steadier driving behavior. This classification of driver types can be implemented, for example, according to the method described in German Patent Application No. 44 01 416 A1, in which various driving styles are described in each case according to a plurality of characteristic numerals. In that case, the characteristic numerals for the longitudinal acceleration, for the transverse acceleration and for deceleration are evaluated separately. Advantageously, the characteristic numeral for the longitudinal acceleration (bkz) is drawn upon for utilization in the method of the present invention.

In Block 102, the individual sensitivity (emp) is determined statistically. In so doing, advantageously the accelerations can be taken into consideration during which the motor vehicle is accelerated within a predefined time interval by approximately 10 km/h. Illustratively, the statistical determination can be implemented according to the description of the method in German Patent Application No. 44 01 416 A1 for each significant acceleration maneuver.

For instance, the maximum accelerator velocity can be determined in Block 102 for each of these vehicle accelerations and be appropriately further processed for the statistical evaluation. To obtain information about the statistical distribution of these maximum values, the newest values are filed in ascending order in one field. This also ensures that old values are discarded after a period of time. Thus, the values of the more recent past receive a greater weighting during the evaluation than the values of the more distant past. Moreover, these values are not distributed normally, because a driver can step on the accelerator arbitrarily slowly, but not arbitrarily quickly. For example, the median (med) and the standard deviation (sig) can be determined. The individual sensitivity of the vehicle driver (emp) then can be calculated according to the formula:

$$emp=med+sig * f,$$

where the sensitivity of the algorithm is adjusted by the factor f.

Determined in Block 103 from the signal of the angular position of the accelerator is the actuating velocity of the accelerator (dpw) as a time derivative of its angular position. In addition, the signal is filtered. In the event of a quick release of the accelerator, the filtering can be advantageously forestalled, in order to react without delay to this demand for vehicle deceleration.

When the accelerator is actuated in the direction of an acceleration, the positive actuating velocity of the accelerator (dpw) ascertained in Block 103 is weighted in Block 104 with the individual sensitivity (emp) determined in Block 102. This variable kfb is determined according to the following equation:

$$kfb=dpw/emp.$$

In response to a release of the accelerator, the variable kfb is reduced via a low-pass filter. The time constant of this low-pass filter is advantageously modified with variable bkz, so that variable kfb is retained longer in the case of a sporty driving technique than for a steady driving technique.

In Block 105, a check is made as to whether a spontaneous demand for a dynamic response exists. For that purpose, the value of variable kfb is compared to a threshold value. If the value of variable kfb exceeds this threshold value, it is inferred that a spontaneous demand exists for a dynamic response, and the appropriate bit kfbbit is set. In this context, the bit is only set when the position of the accelerator is greater than 0. Advantageously, the threshold value can also be varied by variable bkz, thus making it possible to again take a sporty driving technique or a steadier driving technique into account.

Bit kfbbit is reset as soon as variable kfb again falls below the threshold value, and the accelerator is in the 0 position. Thus, "jumps" in the vehicle performance can be advantageously avoided.

Provision is moreover made for a Block 106, in which it is recognized whether it is a question of a nervous driver whose actions are comparatively hectic and, at the same time, quite lacking in intention. This can be recognized, for example, by the method disclosed in commonly-assigned German Patent Application No. 197 30 904.6, which is hereby incorporated by reference herein.

A nervousness bit (nb) is set when the vehicle driver is classified as nervous. When this nervousness bit (nb) is set, bit kfbbit is prevented from being set.

According to the representation of Block 107, an intervention corresponding to the recognized, spontaneous demand for a dynamic response is implemented in the engine/transmission management when bit kfbbit is set. This intervention can, in addition, be carried out as a function of variable kfb, which allows the extent of the dynamic-response demand to again be taken into account.

What is claimed is:

1. A method for recognizing a spontaneous demand by a driver of a motor vehicle comprising:

determining a manner of the driver for actuating an operating device, the manner of the driver capable of being defined as a sportier manner or a steadier manner;

comparing an extent of the actuation of the operating device to a threshold value; and recognizing a dynamic-response demand when the extent of actuation exceeds the threshold value;

the extent of actuation necessary for the recognizing of the dynamic-response demand being greater for the sportier manner than for the steadier manner.

2. The method as recited in claim 1 wherein the operating device is an accelerator.

3. The method as recited in claim 1 wherein the extent of actuation is monitored continuously, and further comprising the step of statistically evaluating the extent of actuation.

4. The method as recited in claim 1 wherein after the dynamic-response demand is recognized, the dynamic-response demand lasts for a period of time, the period of time being longer for the sportier manner than for the steadier manner.

5. The method as recited in claim 1 wherein a value is formed as a function of the extent of the actuation of the operating device and the manner, the value being compared to the threshold value.

6. The method as recited in claim 1 wherein the threshold value is a function of the manner.

7. The method as recited in claim 1 further comprising determining if the driver operating the vehicle is nervous or unsteady, and discontinuing the recognizing step if the driver is nervous or unsteady.

8. A method for recognizing a spontaneous demand by a driver of a motor vehicle comprising:

determining a manner of the driver for actuating an operating device, the manner of the driver capable of being defined as a sportier manner or a steadier manner;

comparing an extent of the actuation of the operating device to a threshold value;

recognizing a dynamic-response demand when the extent of actuation exceeds the threshold value, the extent of actuation necessary for the recognizing of the dynamic-response demand being greater for the sportier manner than for the steadier manner; and statistically evaluating the extent of actuation, the extent of actuation being monitored continuously;

wherein recent values of the extent of actuation receive a greater weighting during the statistic evaluation than older values.

9. A method for recognizing a spontaneous demand by a driver of a motor vehicle comprising:

determining a manner of the driver for actuating an operating device, the manner of the driver capable of being defined as a sportier manner or a steadier manner;

comparing an extent of the actuation of the operating device to a threshold value;

recognizing a dynamic-response demand when the extent of actuation exceeds the threshold value. the extent of actuation necessary for the recognizing of the dynamic-response demand being greater for the sportier manner than for the steadier manner; and filtering the extent of actuation, the filtering being forestalled in the event the operating device is released with an angular velocity above another threshold value.

10. A method for recognizing a spontaneous demand by a driver of a motor vehicle comprising:

determining a manner of the driver for actuating an operating device, the manner of the driver capable of being defined as a sportier manner or a steadier manner, the operating device being an accelerator;

comparing an extent of the actuation of the operating device to a threshold value, the extent of actuation being a detected angular position of the accelerator;

recognizing a dynamic-response demand when the extent of actuation exceeds the threshold value, the extent of actuation necessary for the recognizing of the dynamic-response demand being greater for the sportier manner than for the steadier manner; and filtering the detected angular position of the accelerator, the filtering being forestalled in the event the accelerator is released with an angular velocity above another threshold value.

11. A method for recognizing a spontaneous demand by a driver of a motor vehicle comprising:

determining a manner of the driver for actuating an operating device, the manner of the driver capable of being defined as a sportier manner or a steadier manner;

comparing an extent of the actuation of the operating device to a threshold value; and recognizing a dynamic-response demand when the extent of actuation exceeds the threshold value, the extent of actuation necessary for the recognizing of the dynamic-response demand being greater for the sportier manner than for the steadier manner;

wherein a variable or bit is set for the recognized dynamic-response demand when the dynamic-response demand is recognized, and the variable or bit is reset when conditions for the demand no longer exist and the operating device is not activated.

12. The method as recited in claim 11 wherein the operating device is an accelerator and the operating device is not activated when an accelerator angle equals zero.

* * * * *

UNITED STATES PATENT AND TRADEMARK OFFICE
CERTIFICATE OF CORRECTION

PATENT NO. : 6,278,911 B1
DATED : August 21, 2001
INVENTOR(S) : Gimmler et al.

It is certified that error appears in the above-identified patent and that said Letters Patent is hereby corrected as shown below:

Column 3,
Line 23, change "fiction" to -- function --.

Signed and Sealed this

Fourth Day of June, 2002

*Attest:*

*Attesting Officer*

JAMES E. ROGAN
*Director of the United States Patent and Trademark Office*